United States Patent
Konishi (10) Patent No.: US 6,886,947 B2
(45) Date of Patent: May 3, 2005

(54) PROJECTION TYPE DISPLAY APPARATUS AND IMAGE DISPLAY SYSTEM

(75) Inventor: Takaya Konishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 231 days.

(21) Appl. No.: 10/087,172

(22) Filed: Mar. 1, 2002

(65) Prior Publication Data

US 2002/0126263 A1 Sep. 12, 2002

(30) Foreign Application Priority Data

| Feb. 28, 2001 | (JP) | ........................................ 2001-055510 |
| Mar. 2, 2001 | (JP) | ........................................ 2001-057801 |
| Feb. 22, 2002 | (JP) | ........................................ 2002-046420 |

(51) Int. Cl.$^7$ ............................................. G03B 21/00
(52) U.S. Cl. ........................... 353/119; 353/52; 353/771
(58) Field of Search ............................. 353/52, 56, 61, 353/78, 99, 119; 348/742, 743, 771

(56) References Cited

U.S. PATENT DOCUMENTS 6,179,424 B1 * 1/2001 Sawamura .................... 353/33
6,250,763 B1 * 6/2001 Fielding et al. ................ 353/31
6,357,878 B1 * 3/2002 Sawamura ..................... 353/33
6,419,365 B1 * 7/2002 Potekev et al. ................ 353/98

* cited by examiner

Primary Examiner—William C. Dowling
(74) Attorney, Agent, or Firm—Morgan & Finnegan, LLP (57) ABSTRACT

The present invention provides a projection type display apparatus. The projection type display apparatus for enlarging and projecting an image onto a projected plane includes a projection optical unit for projecting image light onto the projected plane, an optical device for dividing light emitted from a light source into image light that travels to the projection optical unit and unnecessary light that travels outside the projection optical unit, a holding member for holding the projection optical unit, and a light receiving member for receiving the unnecessary light, wherein the light receiving member is provided as a member independent of the holding member. Accordingly, a projection typo display apparatus can be realized that is capable of suppressing or reducing a temperature rise in the holding member caused by the incidence of unnecessary light and the deformation thereof caused by thermal expansion and that is capable of preventing a deterioration in the image quality of a displayed image.

16 Claims, 6 Drawing Sheets

PROJECTION TYPE DISPLAY APPARATUS AND IMAGE DISPLAY SYSTEM

BACKGROUND OF THE INVENTION

1. Field of the Invention

This invention generally relates to a projection type display apparatus, which is also called a projection display, and an image display system, and more particularly to a projection type display apparatus and an image display system for enlarging and projecting an image formed by rays of light guided to a projection optical unit by, for example, a digital micro device (hereinafter referred to as DMD).

2. Description of the Related Art

In recent years, a display apparatus with a large screen has also come into use in general households, and a market demand has been made for a display apparatus having a screen size of 40 inches or more, which brings about manufacturing difficulties in the form of a CRT. Therefore, in order to meet this demand, a projection display, or the like, has been used as a display having a screen size of 40 inches or more.

The projection display has a conventional structure in which divided rays of light of R(red), G(green), B(blue), etc., are irradiated to a small optical device, such as a liquid crystal panel or a DMD, from a high-pressure mercury lamp, a halogen lamp, or a similar lamp (hereinafter, these lamps are each referred to as a light source), and an image output from this optical device is enlarged and irradiated onto a screen by use of a projection optical unit formed as an image formation system that is comprised of a projection lens and a reflection optical element.

In the projection optical unit of the conventional projection display, abovementioned optical elements that form a group and that constitute the projection optical unit are contained in one case in order to prevent the occurrence of errors in the relative position and in the angle between the optical elements. If a DMD is used as the optical device, a brightness-reversed image is output in a direction opposite to a display image that is output in response to light that is input to the DMD from the light source, for structural reasons of the DMD.

Herein, the light used to form the reversed image is unnecessary light that is not guided to the projection optical unit. However, when this unnecessary light is irradiated onto the case and is transformed into thermal energy, the light raises the temperature of the case containing the projection optical unit, and causes the following problems.

That is, with the rise in temperature, the case expands, and, accordingly, errors become great in the relative position and in the angle between the optical elements that constitute the projection optical unit. The positional and angular errors of the optical elements greatly affect an image to be displayed. For example, the errors distort and roughen the quality of an image that is enlarged and projected onto the screen. In addition, if the unnecessary light that has not been intercepted in the case is diffused therein, a ghost occurs, thus deteriorating the image quality. For example, the ghost affects the contrast of an image to be displayed.

SUMMARY OF THE INVENTION

It is therefore an object of the present invention to provide a projection type display apparatus and an image display system capable of preventing deterioration in image quality caused by the fact that the unnecessary light for image display strikes members that hold a projection optical unit.

In order to achieve the object, A projection type display apparatus for enlarging and projecting an image onto a projected plane, comprises a projection optical unit for projecting image light onto the projected plane, an optical device for dividing light emitted from a light source into image light that travels to the projection optical unit and unnecessary light that travels outside the projection optical unit, a holding member for holding the projection optical unit, and a light receiving member for receiving the unnecessary light, wherein the light receiving member is provided as a member independent of the holding member. Herein, the light receiving member can be a light absorbing member. Preferably the light absorbing member has a color that absorbs light. The light receiving member can be disposed not in direct contact with the holding member. The light receiving member can be provided with a heat-releasing member. The heat releasing member can be connected to a member having a greater heat capacity than the heat-releasing member. A heat insulating material can be dispesed between the light receiving member and the holding member. The light receiving member can be disposed so that light reflected by the light receiving member does not strike the optical device or the projection optical unit. The optical device can be a digital micro device that drives a plurality of micro reflecting surfaces and divides light. Preferably the projection optical unit forms an image formation system by use of reflecting optical elements. Preferably the light receiving member has at least one of the light absorbing properties and light reflecting properties.

Further an image display system comprises this projection type display apparatus, an image information input apparatus for inputting image information to the projection type display apparatus.

Further a projection type display apparatus for enlarging and projecting an image onto a projected plane, comprises a projection optical unit for projecting image light onto the projected plane, an optical device or dividing light emitted from a light source into image light that travels to the projection optical unit and unnecessary light that travels outside the projection optical unit, and a holding member for holding the projection optical unit, wherein the holding member has such a shape so as not to directly receive, at least, a part of the unnecessary light. Herein, the optical device can be a digital micro device that drives a plurality of micro reflecting surfaces and divides light. Preferably the projection type display apparatus further comprises a light receiving member for receiving the unnecessary light. The light receiving member can be a light absorbing member. Preferably the light absorbing member has a color that absorbs light. The light receiving member can be disposed not in direct contact with the holding member. The light receiving member can be provided with a heat-releasing member. The heat releasing member can be connected to a member having a greater heat capacity than the heat-releasing member. A heat insulating material can be disposed between the light receiving member and the holding member. The light receiving member can be disposed so that light reflected by the light receiving member does not strike the optical device or the projection optical unit. The optical device can be a digital micro device that drives a plurality of micro reflecting surfaces and divides light. Preferably the projection optical unit forms an image formation system by use of reflecting optical elements.

Further an image display system comprises the projection type display apparatus, an image information input apparatus for inputting image information to the projection type display apparatus.

BRIEF DESCRIPTION OF THE DRAWINGS

(a) of FIG. 6 is a side view of a reflection type image formation device (provided with a light-intercepting member at an angle) in a projection display according to still another embodiment of the present invention, and (b) of FIG. 6 is a side view of a reflection type image formation device (provided with a light-intercepting member horizontally) in a projection display according to embodiment 4 of the present invention.

DETAILED DESCRIPTION OF THE PREFERRED EMBODIMENTS

In the embodiments of the present invention, the application of the aforementioned structures makes it possible to prevent an influence undergone by the fact that a case supporting an image formation mirror is expanded by a temperature rise in a projection display that uses an image formation system comprised of reflection optical elements that for example, are sensitive to positional and angular errors of the image formation mirror and are greatly influential in a deterioration in image quality. As a result, causes for the positional and angular errors of the image formation mirror can be reduced, and an image deterioration (distortion and irregularity) can be prevented.

Further, as described above, a member irradiated with unnecessary light is disposed at such an angle and at such a position that reflection light of the unnecessary light reflected at the surface of the member does not strike an optical device or a projection optical unit, and thereby stray light that has great influence especially when black is displayed can be controlled, and an image deterioration (contrast-down, black relief, ghost, etc.) can be prevented.

Before describing the present invention in detail, a rough description will be given of an example in which an image formation mirror and a DMD for an image display apparatus in a reflection image formation system of a conventional projection display.

Figure 1:
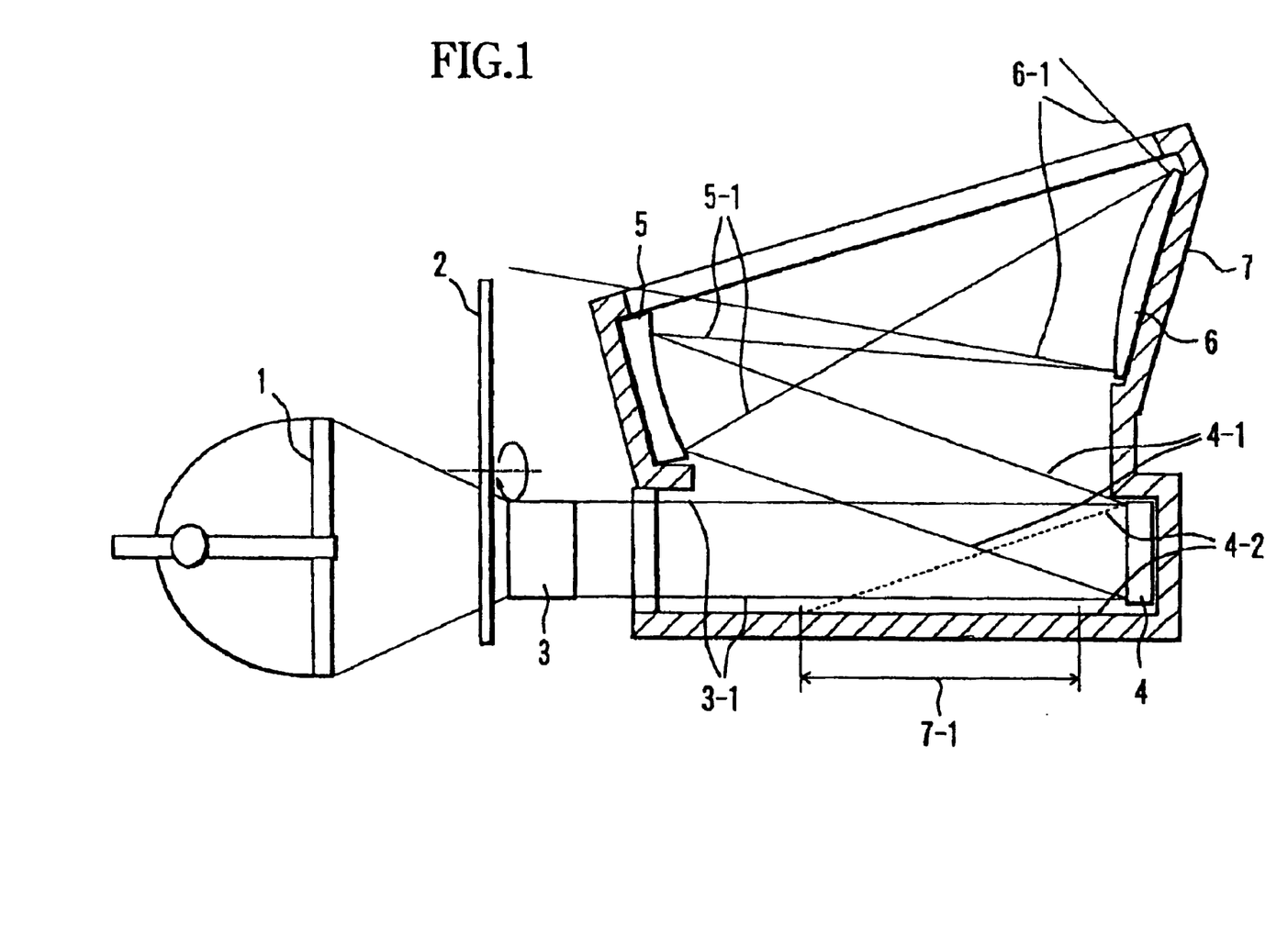
FIG. 1 is a schematic drawing for explaining the structure of a reflection type image formation device in a conventional projection display.

FIG. 1 is a schematic drawing of a conventional projection display that uses an image formation mirror and a DMD.

Light emitted from a light source 1, such as a high-pressure mercury lamp or a halogen lamp, is divided into R, G, B, (W), etc., by rotating a disk-like color filter 2 or the like. The divided light is made uniform by an optical element, such as an integrator 3 (in the figure, a uniformed optical path is designated as 3-1), and is projected onto a DMD 4.

An optical path of an image light necessary to be projected onto a screen is designated as 4-1, and an optical path of an unnecessary image light whose brightness is reversed is designated as 4-2.

Figure 2:
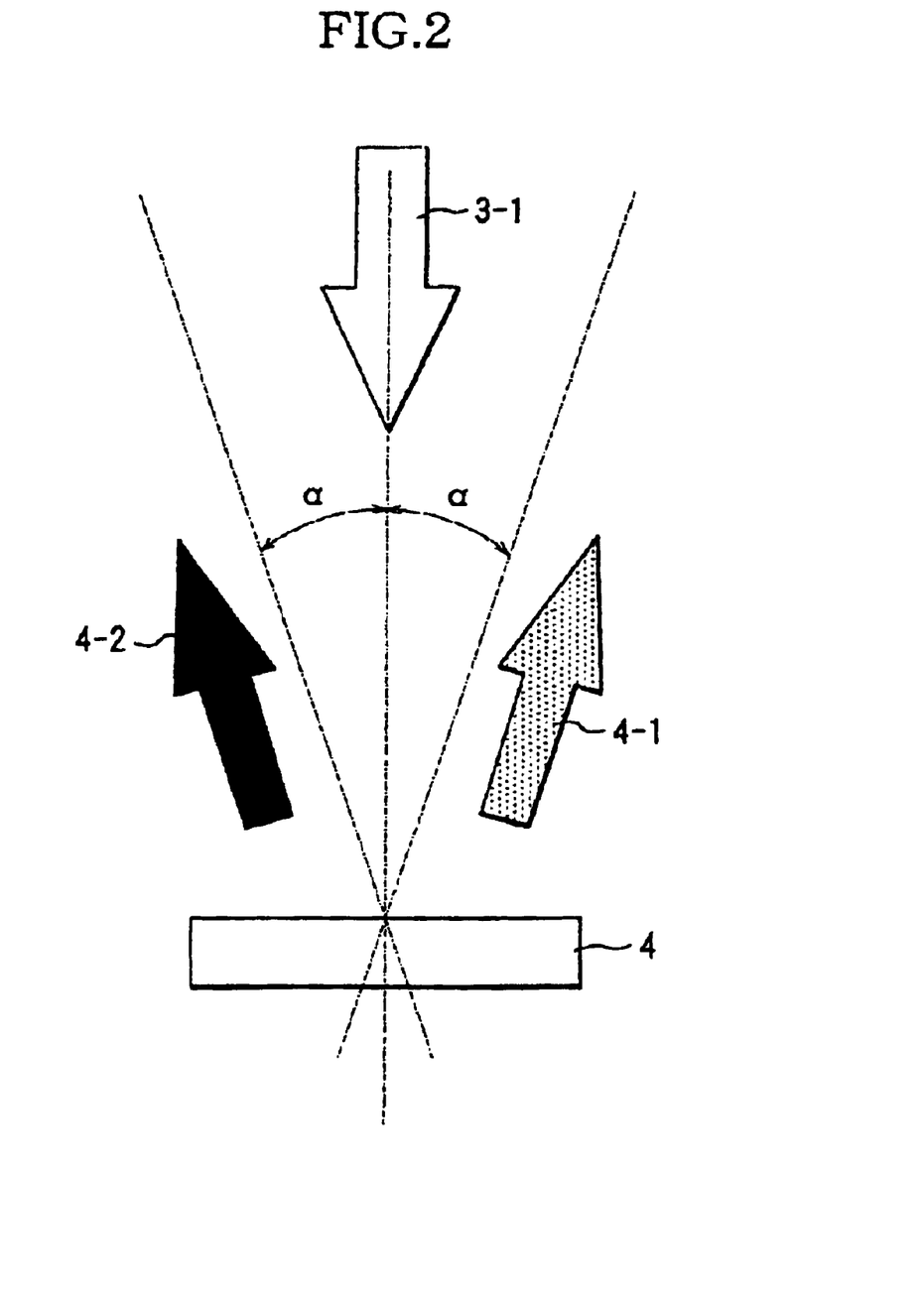
FIG. 2 is a schematic drawing for explaining the entrance/emission of light in a DMD.

The DMD 4 is a group of small reflection optical elements (array of a plurality of micro mirrors), in which the respective reflection optical elements are independently swung and driven in accordance with image information input from an image information input apparatus 20, such as a computer, a video, and a DVD, not shown. In more detail, as shown in FIG. 2, the DMD 4 reflects light 4-1 necessary for an image in a direction at an angle α with respect to incident light, and reflects light 4-2 unnecessary for image display in a direction at an angle α with respect to the incident light opposite to the reflection direction of the necessary image light.

The displayed image is enlarged and projected onto a screen, not shown, through a projection optical unit comprised of image formation mirrors 5 and 6 that are reflection optical elements. 5-1 and 6-1 designate optical paths emitted from the image formation mirror 5 and the image formation mirror 6, respectively.

When the relative distance and angle between the DMD 4 and the image formation mirrors 5 and 6 deviate from design values, distortion or irregularity occurs in the displayed image. Therefore, in order to maintain the accuracy of the position and angle between the DMD 4 and the image formation mirrors 5 and 6, the DMD 4 and the image formation mirrors 5 and 6 are held integrally with a resin-made case 7 as shown in FIG. 1.

However, in the case 7, light is converted into thermal energy, and the temperature of the case 7 is raised in a region 7-1 onto which the unnecessary light strikes. With the temperature rise, the case 7 expands, and errors in the relative position and angle between the image formation mirrors 5 and 6 attached to the case 7 become great and bring about deformation of the image formation mirrors 5 and 6, thus affecting the image quality.

Therefore, in the projection display (projection type display apparatus) of this embodiment, reflected unnecessary light for image display (traveling outside the projection optical unit comprised of the image formation mirrors 5 and 6) emitted from the DMD, which is an optical device, is received by a light absorbing member that is provided as a member independent of the case 7, and thereby the temperature rise in the case 7 is suppressed or reduced.

Figure 3:
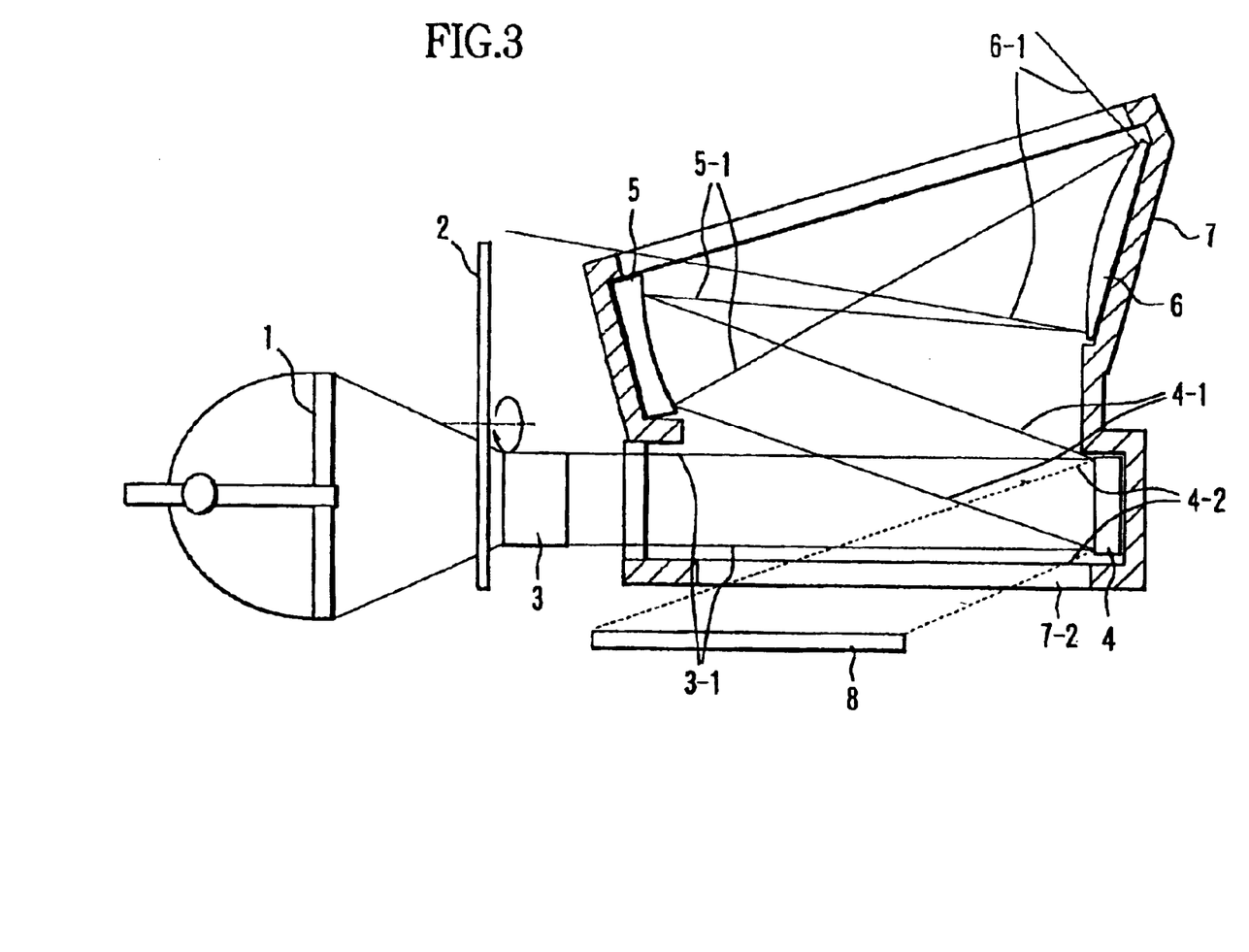
FIG. 3 is a side view of a reflection type image formation device in a projection display according to an embodiment of the present invention.

The structure of the projection display of this embodiment is shown in FIG. 1. In FIG. 3, light emitted from the light source 1 is divided by, for example, a disk-like color filter 2, is then made uniform by an integrator 3, and is irradiated only the DMD 4. A display image to be projected onto a screen, not shown, is enlarged and projected by the image formation mirrors 5 and 6. In this embodiment, an opening part 7-2 is provided so as not to receive light at a case part that corresponds to the region 7-1 of FIG. 1, and a light absorbing member 8 used to absorb unnecessary light is provided at a position not in direct contact with the case 7.

Herein, the light absorbing member 8 has such a structure so as to easily absorb light. For example, the surface thereof is coated with black paint, such as chrome, or is roughened to have fine irregularities without being smoothoned. Alternatively, a material having high thermal conductivity can be used as the light absorbing member, for example, a black aluminum or a metal coated by black paints like Chromium. Or, off course, other material may be available.

Figure 4:
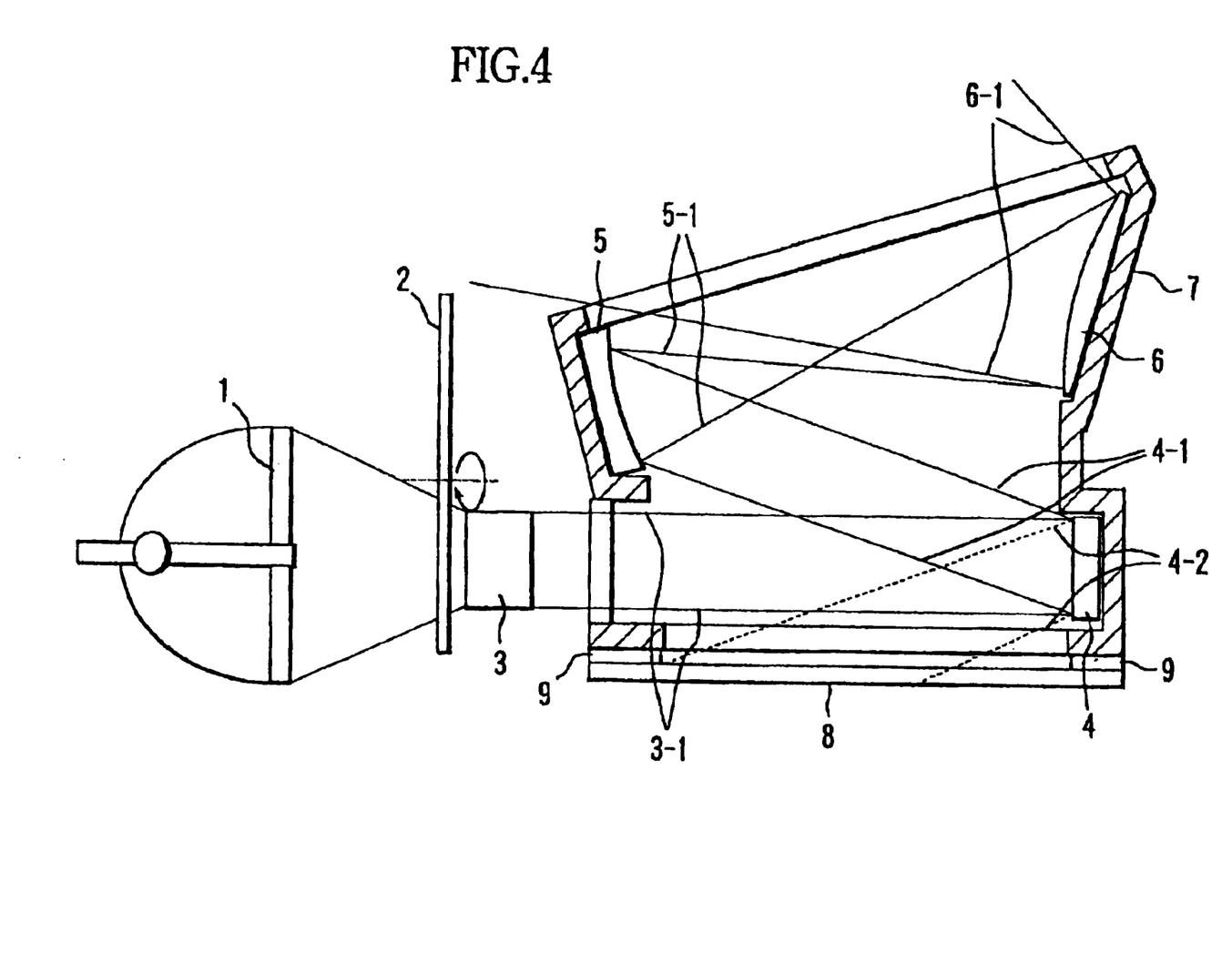
FIG. 4 is a side view of a reflection type image formation device in a projection display according to another embodiment of the present invention.

FIG. 4 shows the structure of a protection type display apparatus, which is another embodiment of the present invention.

The basic structure of the projection type display apparatus is almost the same as the aforementioned embodiment. That is, light emitted from the light source 1 is divided by, for example, the disk-like color filter 2, is then made uniform by the integrator 3, and is irradiated onto the DMD 4.

A display image to be projected onto a screen, not shown, is enlarged and projected by the image formation mirrors 5 and 6.

Also in this embodiment, the opening part 7-2 is provided so as not to receive light at a case part that corresponds to the region 7-1 of FIG. 1. In this embodiment, the light absorbing member 8 used to absorb unnecessary light is provided with a heat insulating material 9 between the case 7 and the light absorbing member 8. Accordingly, the thermal expansion of the case 7 caused by absorbing unnecessary light can be prevented.

Figure 5:
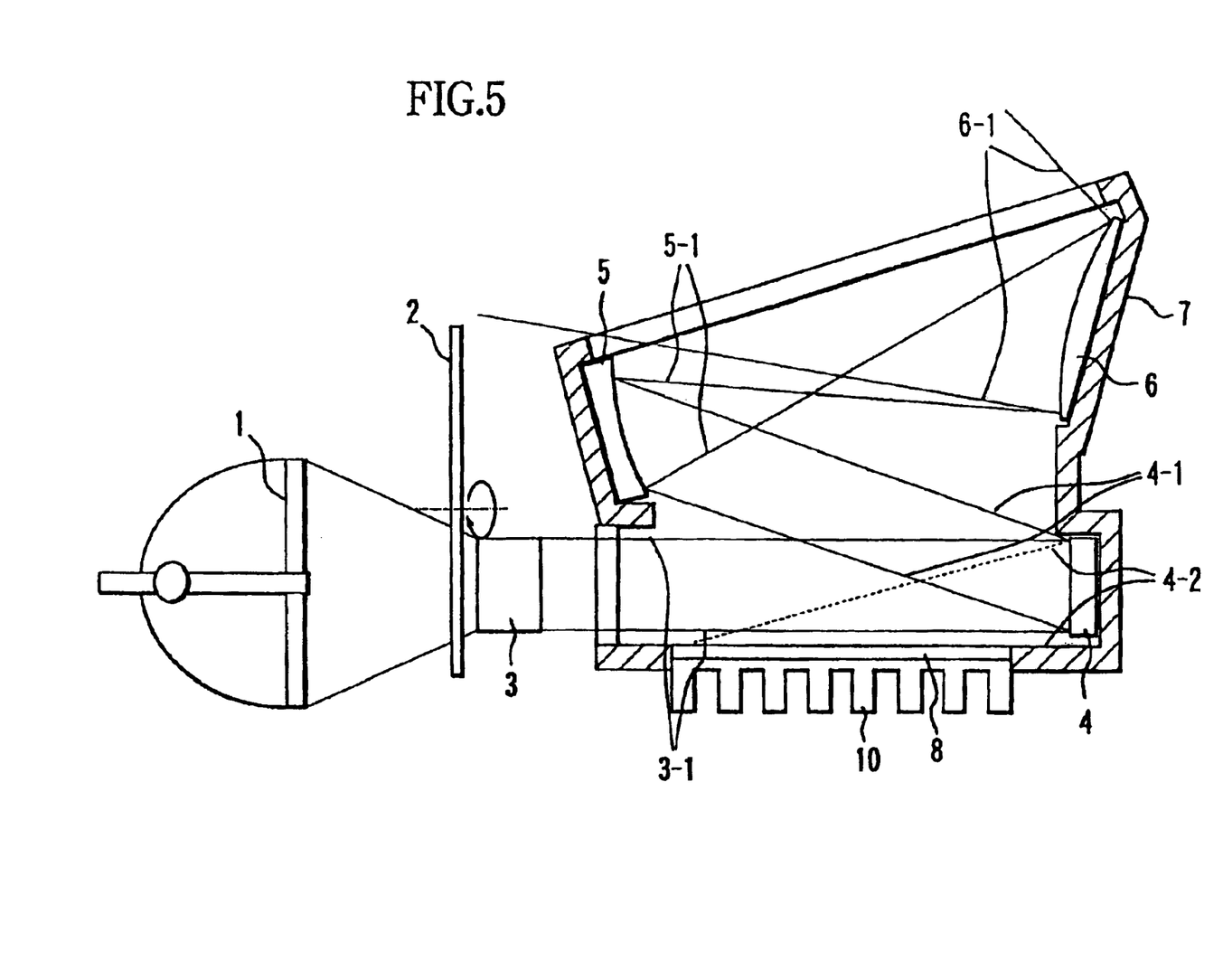
FIG. 5 is a side view of a reflection type image formation device in a projection display according to skill another embodiment of the present invention.

FIG. 5 shows the structure of a projection type display apparatus, which is still another embodiment of the present invention.

The basic structure of the projection type display apparatus is almost the same as the aforementioned embodiment. That is, light emitted from the light source 1 is divided by, for example, the disk-like color filter 2, is then made uniform by the integrator 3, and is irradiated onto the DMD 4.

A display image to be projected onto a screen, not shown, is enlarged and projected by the image formation mirrors 5 and 6. Also in this embodiment, the opening part 7-2 is provided so as not to receive light at a case part that corresponds to the region 7-1 of FIG. 1.

In this embodiment, a heat releasing member, such as a heat sink or heat pipe 10, is provided on the side of the outer wall of the light absorbing member 8 used to absorb the unnecessary light.

The heat releasing member can be connected to a member, not shown, that is greater in heat capacity than the heat releasing member and that is attached to the main body of the projection type display apparatus, not shown, in order to more effectively prevent the thermal expansion of the case 7 caused by the absorption of unnecessary light.

Figure 6:
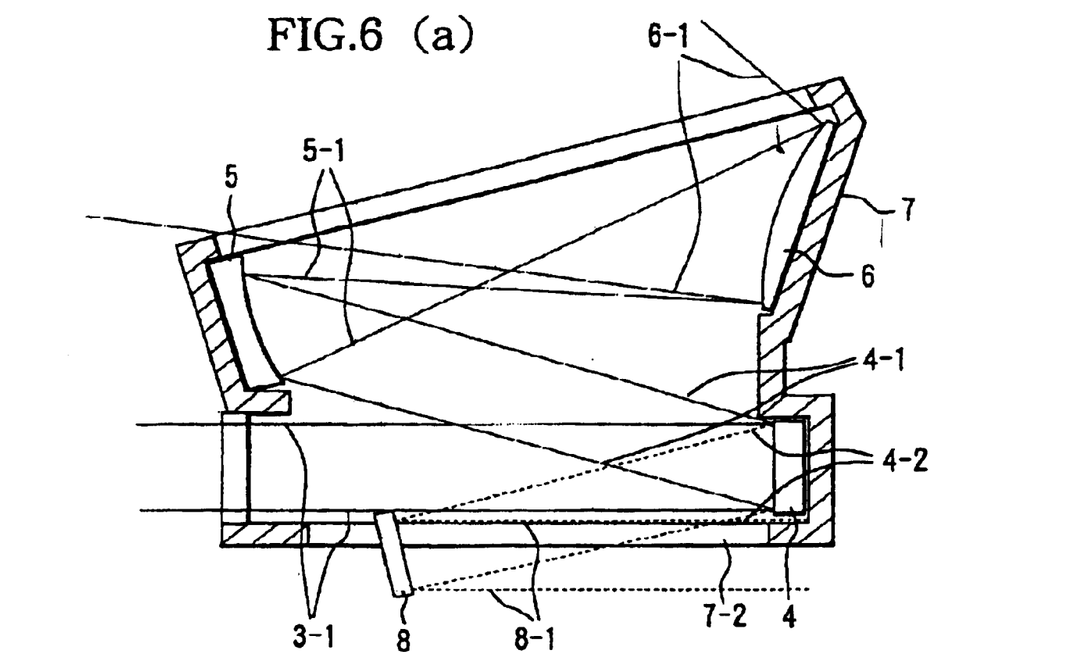

(a) and (b) of FIG. 6 each show the structure of a projection type display apparatus, which is still another embodiment of the present invention.

The basic structure of the projection type display apparatus is almost the same as the aforementioned embodiment. That is, light emitted from the light source 1 is divided by, for example, the disk-like color filter 2, is then made uniformed by the integrator 3, and is irradiated onto the DMD 4.

A display image to be projected onto a screen, not shown, is enlarged and projected by the image formation mirrors 5 and 6.

In each embodiment mentioned above, even if the light absorbing member 8 that absorbs the unnecessary light is painted black, the unnecessary light is not completely absorbed, and therefore the light cannot be stopped from being reflected to some extent. However, in the projection type display apparatus, this reflected light, i.e., stray light, has a great influence especially when black is displayed.

Therefore, in this embodiment, the attachment angle of the light absorbing member 8 is set so that unnecessary light reflected by the light absorbing member 8 does not proceed to the inner wall surface of the case 7, to the DMD 4, or to the image formation mirrors 5 and 6, thus controlling the stray light.

8-1 of the figure designates light reflected at the light absorbing member 8 of the unnecessary light from the DMD 4.

(a) of FIG. 6 shows an example in which the angle of the light absorbing member 8 is set so that the light reflected by the light absorbing member 8 of the unnecessary light from the DMD 4 proceeds outside the case 7. (b) of FIG. 6 shows an example in which the angle of the light absorbing member 8 is set to be horizontal, and the light absorbing member 8 is disposed so that the light reflected by the light absorbing member 8 of the unnecessary light from the DMD 4 proceeds outside the case 7.

In each embodiment mentioned above, a description was provided with an example in which a DMD is used as the optical device. However, in the present invention, use can be made of an optical device that divides light from the light source into image light and unnecessary light by an optical deflection function or an optical diffraction function, instead of the DMD.

Further, instead of the image formation mirror mentioned in each embodiment, all image formation system in which an image formation lens and a return mirror are combined with each other can be used as the projection optical unit. In this example, the return mirror may be a plane mirror or a curved mirror like a spherical mirror or an a spherical mirror.

On the aforementioned embodiments, the projection type display apparatus described above is applicable to the image display system. The image display system is provided, as an image information input device for inputting image information to the projection display device, with a device to read image information from storage media of a personal computer, a video system or a DVD system, or with a mean to obtain image information by wire or unwire transmission (a ground wave broadcasting, a satellite broadcasting etc.). Furthermore, it is preferable that the image information input device is built in the projection type display apparatus.

As described above, according to the aforementioned embodiments, unnecessary light separated by an optical device, such as a DMD, is absorbed by the light absorbing member 8 that is a member independent of the case 7 and that is a holding member that holds a projection optical unit, such as the image formation mirrors 5 and 6, and therefore a temperature rise in the case 7 caused by the incidence of unnecessary light (i.e., deformation resulting from the thermal expansion of the case 7) can be suppressed or reduced. Therefore, errors in the relative position or in the angle between the optical elements (image formation mirrors 5 and 6) of the projection optical unit can be prevented from being enlarged, and a projection type display apparatus and an image display system capable of preventing a deterioration in the image quality of a displayed image can be realized.

What is claimed is:

1. A projector projecting an image onto a projected plane by a projection optical unit, comprising:
    an optical device dividing light emitted from a light source into a first light that travels to the projection optical unit and a second light that travels in a direction different from the first light,
    a holding member holding the projection optical unit,
    a light receiving member receiving the second light, and
    a heat insulating member disposed between the light receiving member and the holding member.

2. The projector according to claim 1, wherein the light receiving member is a light absorbing member which includes black aluminum and chromium.

3. The projector according to claim 1, wherein the light receiving member is provided with a heat releasing member which includes a heat sink.

4. The projector according to claim 1, wherein the light receiving member is provided with a heat-releasing member which includes a heat pipe.

5. The projector according to claim 1, wherein the light receiving member is disposed so that the second light reflected by the light receiving member does not proceed to the optical device, projection optical unit and holding member.

6. The projector according to claim 1, wherein the optical device is a digital micro device that drives a plurality of micro reflecting surfaces and divides incident light into the first light and the second light so that the first light and the second light are symmetric with respect to an optical axis of the incident light.

7. An image display system comprising:

the projector according to claim 1, and an image information input apparatus inputting image information to the projector.

8. A projector projecting an image onto a projected plane by a projection optical unit, comprising:

an optical device dividing light emitted from a light source into a first light that travels to the projection optical unit and a second light that travels in a direction different from the first light, and a holding member holding the projection optical unit, the holding member having an opening disposed so as to avoid direct receipt of the second light.

9. The projector according to claim 8, wherein the optical device is a digital micro device that drives a plurality of micro reflecting surfaces and divides incident light into the first light and the second light so that the first light and the second light are symmetric with respect to an optical axis of the incident light.

10. The projector according to claim 8, further comprising a light receiving member receiving the second light, which is disposed outside of the holding member.

11. The projector according to claim 10, wherein the light receiving member is a light absorbing member which includes black aluminum or chromium.

12. The projector according to claim 10, further comprising a heat insulating member disposed between the holding member and the light receiving member.

13. The projector according to claim 10, wherein the light receiving member is provided with a heat releasing member which includes a heat sink.

14. The projector according to claim 10, wherein the light receiving member is provided with a heat releasing member which includes a heat pipe.

15. The projector according to claim 10, wherein the light receiving member is disposed so that light reflected by the light receiving member does not proceed to the optical device, the projection optical unit and holding member.

16. An image display system comprising:

the projector according to claim 8, and an image information input apparatus inputting image information to the projector.

* * * * *

UNITED STATES PATENT AND TRADEMARK OFFICE
CERTIFICATE OF CORRECTION

PATENT NO. : 6,886,947 B2
DATED : May 3, 2005
INVENTOR(S) : Konishi

It is certified that error appears in the above-identified patent and that said Letters Patent is hereby corrected as shown below:

Title page,
Item [30], Foreign Application Priority Data, delete the following applications:
"Feb. 28, 2001  (JP)                              2001-055510"
"Feb. 22, 2002  (JP)                              2002-046420".

Signed and Sealed this

Eighth Day of November, 2005

JON W. DUDAS
*Director of the United States Patent and Trademark Office*